Dec. 20, 1966  B. FISHER  3,293,424
ANALOG MULTIPLIER
Filed May 28, 1963  3 Sheets-Sheet 1

*INVENTOR.*
BENJAMIN FISHER
BY
ATTORNEY

Dec. 20, 1966  B. FISHER  3,293,424
ANALOG MULTIPLIER
Filed May 28, 1963  3 Sheets-Sheet 3

INVENTOR.
BENJAMIN FISHER
BY Roef M Pitts
ATTORNEY

United States Patent Office 3,293,424
Patented Dec. 20, 1966

3,293,424
ANALOG MULTIPLIER
Benjamin Fisher, Anaheim, Calif., assignor to
North American Aviation, Inc.
Filed May 28, 1963, Ser. No. 283,746
18 Claims. (Cl. 235—194)

This invention relates to analog multipliers and more particularly to an electronic multiplier employing feedback means to achieve improved performance.

In the prior analog computer art, the process of analog multiplication of two numbers has been achieved by employing an analog voltage (representing a number to be multiplied) to modulate a second analog voltage (representing a multiplicand) to achieve a resulting voltage analog of the product of the two numbers. One such prior art device comprises a positional servo-mechanism driving a potentiometer. The potentiometer is excited by a voltage which is an analog of the number to be multiplied. The positional servo is driven by an analog voltage representing a multiplicand, whereby the position of the potentiometer pick-off is driven in accordance with the input to the servo. Hence, the output of the potentiometer being proportional to the potentiometer pick-off position, is therefore proportional to the input to the servo. Because the output of the potentiometer is also proportional to the excitation to the potentiometer, such output is indicative of the product of the potentiometer excitation and the servo input (i.e., the product of the two voltages to be multiplied). While such servomotor driven devices are functionally effective, yet they suffer from performance limitations due to the time-lag or dynamic response characteristic of the servo motor employed in the position servo. Therefore, accurate outputs cannot be provided for rapidly changing analog inputs-to-be-multiplied. Also, such devices require careful adjustment to assure alignment of mechanical and electrical nulls, whereby a zero input to the servo provides a true zero output or product signal. Also such devices are limited in ability to resolve small changes in input signals. Further, the size, cost and power requirement of such devices often make the use of analog techniques prohibitive in complex computing applications for aircraft and satellite vehicle systems.

Another type of prior art multiplier has employed pairs of multielectrode tubes such as pentodes as voltage-sensitive gain devices, whereby the gain of such tubes to a first signal to be amplified is adjusted by the response of such tubes to a second signal applied to a gain-control electrode. However, such circuit devices are not stable, and require careful matching of the electron tubes employed. Also, the gain characteristics thereof are not stable, and change substantially with temperature and age, which further aggravates the requirements for matched circuit elements and frequent maintenance and adjustment of such devices.

In fine, the prior art multipliers have not provided highly-accurate analog means which are both reliable and subject to microminiaturization techniques.

Further, such voltage sensitive elements have been operated at extreme operating points so as to be either cut off or saturated in attempts to obtain a zero output when either of the multiplier signals are zero. However, the performance limitations of attempting control in such a region of minimum sensitivity produces poor null product-signal quality.

The concept of the subject invention is the application of a voltage-sensitive feedback impedance in a novel feedback circuit arrangement to achieve highly-accurate, highly reliable analog multiplier means of minimum size and weight.

In a preferred embodiment of the invention there is provided gain-controlled amplifying means having a gain-control input and adapted to be connected to a first and second signal source. There is also provided signal-combining means for differentially combining the sum of the signal source outputs with the output from the amplifying means. The gain-control input of the amplifying means is responsively connected to the signal combining means for automatically adjusting the gain of the gain-controlled means. Signal code means is employed for suppressing a gain control input corresponding to that component of the output of the signal combining means corresponding to signal from the first signal source. The control input is also adapted to be responsively connected to a third signal source.

In normal operation of the above described arrangement, the coded second signal causes the gain of the amplifier to achieve a stabilized value of unity, whereby the phase-inverted output of the amplifier (in the presence of no second or third multiplier signal) will be substantially cancelled or offset by the first and second signal inputs to the signal-combining means. Hence, in the absence of the third or multiplier signal, a substantially null output signal occurs at the output of the signal-combining means.

Similarly, in the presence of a finite (third or) multiplier signal applied to an input of the summing means (so as to incrementally vary the gain of the amplifier) and in the absence of a first signal, only the phase-inverted second signal (from the amplifier) is summed with the second signal and third multiplier signal inputs to the signal combining means. However, the gain of the phase-inverted amplifier output is changed sufficiently (in response to the third or multiplier signal) so as to substantially offset both the second signal and third signal inputs to the signal-combining means. Hence, in the absence of a first signal, the output of the summing means is substantially zero. Further, in the presence of both a first and third multiplier signal, the gain of the phase-inverted output of the amplifier is incrementally changed in response to the third or multiplier signal, whereby the output of the signal combining or summing means is substantially proportional to the product of the numbers represented by the analog first and third multiplier signals.

The device of the invention requires no mechanical or electromechanical parts as to avoid mechanical "wearing out" problems and mechanical alignment problems. Moreover, in employing no mechanical or electromechanical parts, the device of the invention may be made very small, using microminiaturization techniques in the manufacture of such circuit device. Further, the dynamic response of the device will be limited only by the time-constants of the circuit parameters.

Accordingly, it is an object of the subject invention to provide improved electronic multiplier means.

It is another object of the invention to provide an electronic multiplier having improved null performance characteristics.

It is still another object of the invention to provide analog multiplier means not subject to electromechanical null misalignment, mechanical wear, and limited resolution.

It is yet another object of the invention to provide highly accurate analog multiplier means capable of being miniaturized It is a further object of the invention to provide analog multiplier means that require fewer matched components, and that is relatively easy to maintain.

It is yet a further object of the invention to provide an analog multiplier having improved dynamic response.

These and other objects will become apparent from the drawings in which.

Figure 5:
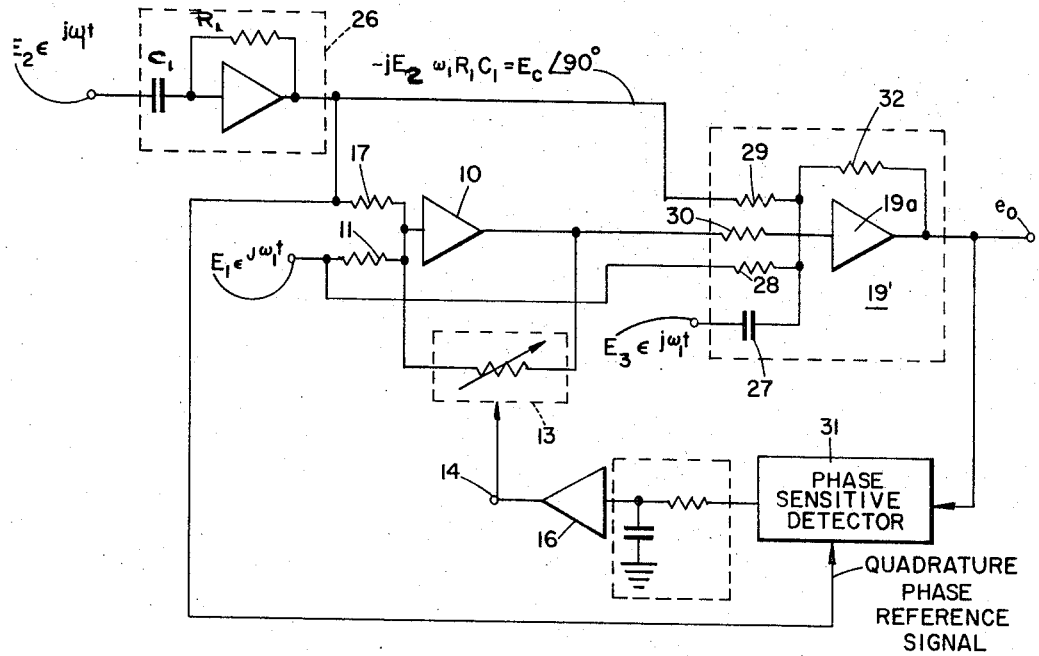
FIG. 5 is a schematic diagram of a preferred embodiment of the invention.
Figure 6:
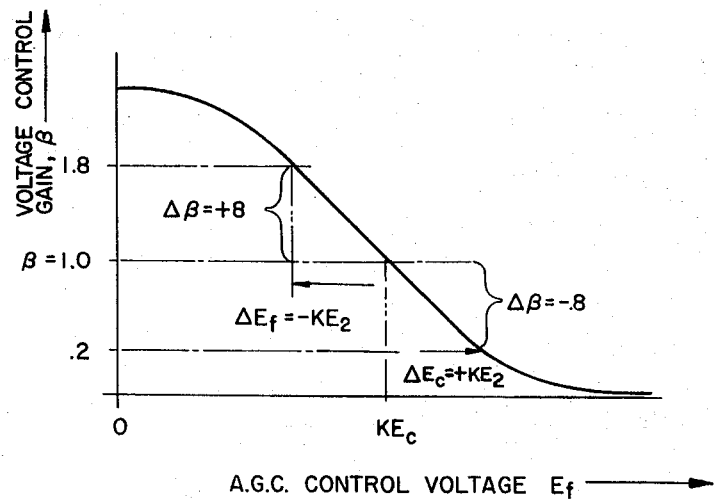

And FIG. 6 is a graph of the preferred response of the gain-controlled amplifier of FIG. 5.

In the figures, like reference characters refer to like elements.

Figure 1:
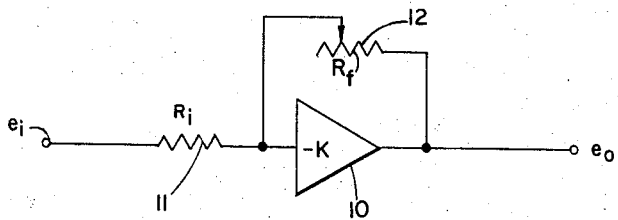
FIG. 1 is a schematic diagram of an adjustable-gain feedback amplifier.

Referring to FIG. 1, there is illustrated a schematic diagram of an adjustable gain feedback amplifier. There is provided a high gain (say, $-K=10,000$ to 1) phase-inverting amplifier 10 having an input resistor 11 interconnecting an input of amplifier 10 to a source of an input signal, $e_1$. A variable feedback resistor 12 interconnects the output and input of amplifier 10. Because of the phase-inversion or sense reversal of the output, $e_o$ generated relative to an applied input, $e_1$ (indicated by the negative sense ($-$) of the amplifier gain, $-K$), the arrangement of FIG. 1 is a negative feedback amplifier. Because of the relatively high forward gain (10,000) selected for amplifier 10, the effective static gain, $e_o/e_1$, of the closed loop arrangement of FIG. 1 is independent of the gain, $-K$, of element 10; and is described by the ratio $\beta$ of the feedback resistance $R_f$ (of resistor 12) to the input resistance (of resistor 11):

$$\frac{e_o}{e_i}\frac{R_f}{R_i}=\frac{\beta R_i}{R_i}=\beta \tag{1}$$

where $R_f = \beta R_i$.

Such gain relationship is well understood in the art, being illustrated for example, in FIG. 1.5(b) on page 13 of "Electronic Analog Computers" (2nd edit.), by Korn and Korn, published by McGraw-Hill (1956).

Hence, the expression for the output voltage, $e_o$, is equal to the product of the input voltage, $e_1$, and the gain, $\beta$, of the feedback combination:

$$e_o = \beta e_1 \tag{2}$$

Now, if the gain $\beta$ (i.e., the value $R_f$ of the feedback impedance 12, normalized in terms of the input impedance $R_i$), is adjusted so as to represent a variable analog multiplier quantity, and the input voltage, $e_i$, is selected to represent an analog of a quantity to be multiplied, it is to be seen that the output voltage, $e_o$, is an analog of the product of the two quantities.

Figure 2:
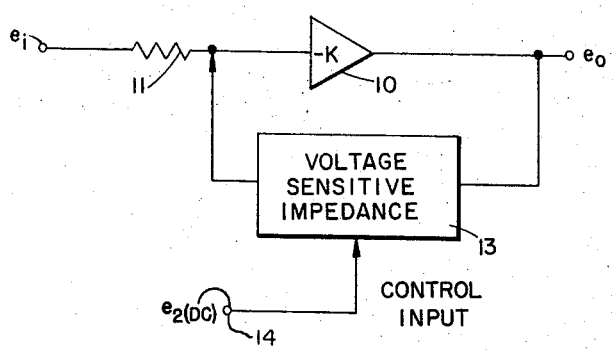
FIG. 2 is a schematic diagram of a gain-controlled feedback amplifier employing a voltage-sensitive feedback impedance.

One means of effecting a variation of the feedback impedance of the negative feedback arrangement of FIG. 1 (in response to an electrical signal analog of a multiplier quantity) is to employ a voltage-sensitive impedance for the feedback impedance 12 in FIG. 1, as is shown in FIG. 2.

Referring to FIG. 2, there is ilustrated a schematic diagram of a gain-controlled feedback amplifier employing a voltage-sensitive feedback impedance 13 having a control input terminal 14. Feedback impedance 13 may be comprised of a field-effect transistor or other voltage sensitive impedance means known in the art. Accordingly, element 13 is shown in block form only. The gain of the feedback arrangement of FIG. 2 is approximated as the ratio $\beta$ of the feedback impedance to the input impedance.

Now, where the impedance of element 13 is sensitive to D.-C. voltages, a D.-C. control signal, $e_2$, applied to control terminal 14 of impedance element 13 will cause the impedance value of element 13 to vary as a function thereof:

$$R_f = \beta R_i = fn(e_2) \tag{3}$$

Therefore, the gain $\beta$ of the feedback arrangement of FIG. 2 will vary as a function of the control voltage, $e_2$. Accordingly, the output, $e_o$, of amplifier 10 will be indicative of the product of the input, $e_i$, and such function of the control voltage, $e_2$.

$$e_o = e_1\beta = e_1 fn(e_2) \tag{4}$$

Such an arrangement, however, is not adequate for purposes of analog multiplication. In other words, in general:

$$fn(e_2) \neq Ke_2 \tag{5}$$

and $$e_1 fn(e_2) \neq Ke_1 e_2 \tag{6}$$

$$e_o \neq Ke_1 e_2 \tag{7}$$

Therefore:

Further, not only is the product relationship not generally obtained at the output, but it seems difficult to realize at all over a practically useful region in a physically realizable device. For example, the impedance of a field effect transistor (employed as impedance 13 in FIG. 2) in general does not linearly decrease to zero as the applied control voltage, $e_2$, falls to zero. Instead, it would assume some finite value other than zero. Hence, a bias or offset value $\beta_o$ occurs for $\beta$ in the absence of an applied control voltage, $e_2$. In other words, the product $(e_1 \times e_2 = 0)$ would be represented by a finite voltage $e_o = \beta_o e_1$, which would be equal to zero *only* under the condition that $e_1$ was zero, and *not* necessarily because $e_2$ was zero.

Figure 3:
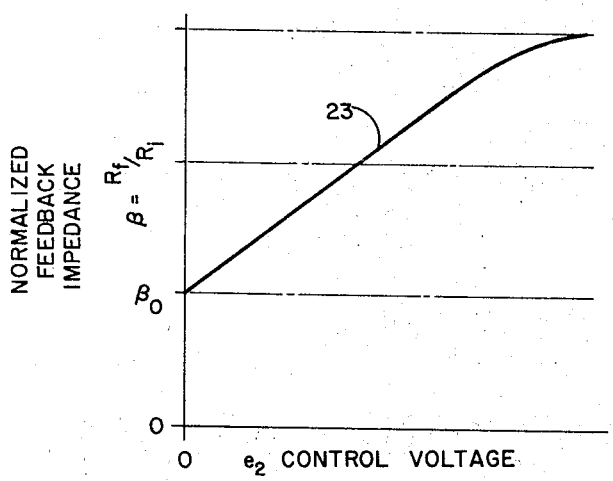
FIG. 3 is a graph illustrating an exemplary gain response of the device of FIG. 2 as a function of a gain-control voltage applied to the voltage sensitive feedback impedance.

That the arrangement of FIG. 2 is not adapted to performing precise analog multiplication is to be seen from the response curve shown in FIG. 3. Referring to FIG. 3, there is illustrated a typical curve of the impedance response of the feedback impedance 13 to the control voltage $e_2$ of FIG. 2. The impedance $R_f$ of feedback element 13 has been normalized to the impedance $R_1$ of input element 11 of FIG. 2. In other words, $$R_f \text{ (normalized)} = \frac{R_f}{R_1} = \frac{\beta R_i}{R_i} = \beta$$

It is seen from curve 23 in FIG. 3 that for $e_2 = 0$; $\beta = \beta_o \neq 0$. Further, even if it is assumed that the voltage-sensitive impedance has a linear response region $$\left(\frac{\Delta \beta}{\Delta e_2} = K\right)$$

and, further, that such region exists about the range of control voltage inputs, $e_2 = 0$ to $e_2 = (0 + \Delta e_2)$, yet the function $(\beta = fn(e_2))$ is not directly proportional to $e_2$, because of the offset $\Delta\beta = \beta_o$. Therefore, the error in the resultant product computation $(e_1 \times e_2)$ is equal to $\beta_o e_1$, which increases as $e_1$ increases, being zero only when $e_1$ itself is zero.

Further, the nature of the offset $\beta_o$, may be variable, being a function of the temperature sensitivity and aging characteristics of the voltage sensitive impedance. Further, the proportionality, K, or slope of the linear region of the incremental impedance response to a control voltage $e_2$ may also change due to such temperature sensitivity and aging. Hence, it is to be appreciated that the device of FIG. 2 is somewhat less than an ideal electronic analog multiplier.

Figure 4:
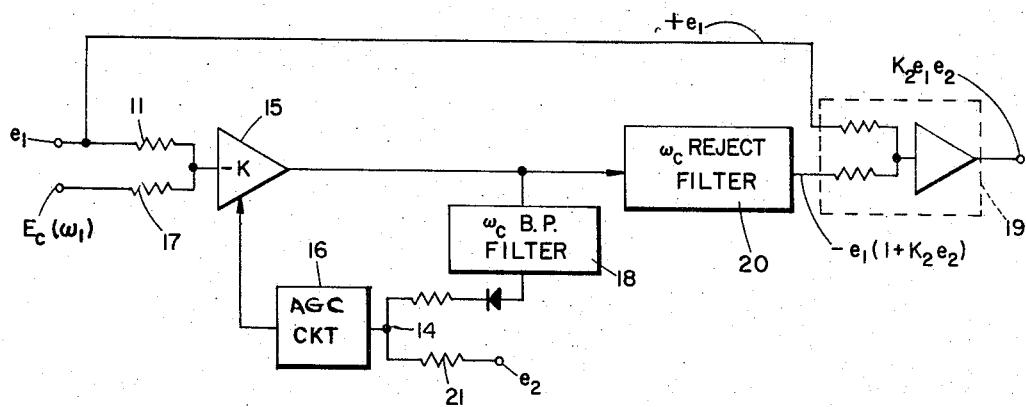
FIG. 4 is a block diagram of an exemplary embodiment of a concept of the invention.

An improved electronic analog multiplier embodying a novel closed loop concept of the invention to minimize the effects of (1) feedback impedance offset associated with extreme control voltage conditions, and (2) circuit parameter drifts, is shown in FIG. 4.

Referring to FIG. 4, there is illustrated a block diagram of an exemplary embodiment of the invention. There is provided an automatic gain control loop comprising a voltage-sensitive gain-controlled amplifier 15 and gain-control stage 16 arranged to cooperate by means well understood in the art. A summing network comprising summing resistors 11 and 17 connects an input of amplifier 15 to a first source of a low frequency or D.-C. signal-to-be-multiplied, $e_1$, and a second or reference A.-C. signal of fixed amplitude, $Ec(\omega_1)$, of high-frequency, relative to that of $e_1$. However, the frequencies of both $e_1$ and $Ec(\omega_1)$ are selected to lie within the bandpass of amplifier 15.

A bandpass filter 18 is interposed between the output of amplifier 15 and the input to gain control element 16 and is adapted to pass components of the amplifier output corresponding to the $Ec(\omega_1)$ input and to suppress or attenuate components corresponding to the $e_1$ input. In this way, the gain of phase-inverting amplifier 15 is adjusted in response to the reference signal, $Ec(\omega_1)$; but not by $e_1$. In other words, as $Ec$ increases, the gain of amplifier 15 is reduced; and as $Ec$ decreases, the gain of amplifier 15 is increased, whereby the action of the automatic gain control loop serves to provide a constant output component corresponding to the $Ec(\omega_1)$ input. Thus, it is to be appreciated that the gain of amplifier 15 varies inversely with the magnitude of the reference input, $Ec(\omega_1)$; as is well understood in the art.

By adjusting the level of the reference signal, the gain of amplifier 15 can be adjusted to a preselected value, such as unity volts per volt, for reasons which will become apparent.

There is also provided in the embodiment illustrated in FIG. 4, a summing amplifier 19 responsive to the source of the signal-to-be-multiplied, $e_1$, and to that component of the output of phase-inverter amplifier 15 corresponding to the $e_1$ input thereto. Such restricted response of summing means 19 to the output of amplifier 15 is achieved by means of filter 20 interposed between amplifier 15 and summing means 19. The purpose of band-reject filter 20 is to attenuate high-frequency components corresponding to the reference input signal to amplifier 15 while not attenuating components corresponding to the first input signal, $e_1$.

AGC element 16 is made further responsive to a multiplier signal $e_2$, by means of a summing network comprising summing resistor 21. $e_2$ may be a D.-C. signal of suitable sense applied to resistor 21, or may be a suitably detected A.-C. signal.

Now, in the absence of a multiplier signal, $e_2$, the normal response of amplifier 15 to the signal-to-be-multiplied, $e_1$ and the adjusted reference signal, $Ec(\omega_1)$, is to provide a phase-inverted input $(-e_1)$ to summing means 19, corresponding to the input $(+e_1)$ to amplifier 15, (filter 20 attenuating or not passing an output from amplifier 15 corresponding to the reference signal, $Ec(\omega_1)$).

This phase-inverted signal $(-e_1)$ is combined with the first input signal $(+e_1)$ by summing means 19 to provide a zero or null output, in the absence of a multiplier signal $e_2$ applied to the input of AGC element 16.

Hence, the null output of summing means 19 corresponds to the product of $e_1$ and $e_2$ where $e_2$ is zero. Further, it is clear that if $e_2$ were a finite value other than zero, the output of summing means 19 would yet be zero for a value of $e_1=0$. Hence, such null output would also correspond to the product of $e_1$ and $e_2$ where $e_1$ is zero. Moreover, if the operating point of the amplifier should change, due to aging or temperature sensitivity of any of the components comprising the AGC loop, the response of the loop will tend to compensate therefor so as to preserve the preselected closed loop gain of amplifier 15.

Further, for finite values of $e_1$ other than zero, the effect of the multiplier input, $e_2$, to AGC element 16 is to perturb the gain of amplifier 15 from unity by an amount, $K_2e_2$. In other words, the perturbed gain of amplifier 15 is $(1+K_2e_2)$. Therefore, the input of summing means 19 from reject filter 20 is $-e_1(1+K_2e_2)$. Accordingly, the output $e_0$ of summing means 19 is expressed as the sum of the inputs thereto:

(9) $\quad e_0 = e_1 - e_1(1+K_2) = K_2 e_1 e_2$

Hence, it is to be seen that the arrangement of FIG. 4 provides means for generating a signal indicative of the product of two quantities represented by analog voltages, and having improved performance for products equal to or approaching zero.

Further, the sense of the product signal is determined by the sense of each of $e_1$ and $e_2$, whereby so-called four quadrant multiplication may be effected.

Such improved performance for zero multiplier signals is achieved by operating the voltage-sensitive phase-inverting amplifier at a nominal operating point of high sensitivity for a preselected gain or scaling of the input signal-to-be-multiplied, and then summing the phase-inverted output thereof with the input which has been similarly scaled. Such gain adjustment or signal-scaling may be achieved, for example, by adjustment of the resistances of the summing resistors employed in the summing means, as is well-understood in the analog computer art.

The novel arrangement of FIG. 4 while providing the advantage of improved multiplier performance, yet requires that amplifier 15 have a broad band response in order to handle both the input signal $e_1$ and the frequency-shifted reference signal $Ec(\omega_1)$. Further, a band reject filter is required at the input to the summing means. Such requirements increase the design complexity of an analog multiplier.

A preferred embodiment of the invention employing a narrow band-pass voltage-sensitive amplifier is shown in FIG. 5.

Referring to FIG. 5 there is illustrated a preferred embodiment of the invention, especially suitable for multiplying A.-C. signals.

There are provided first, second and third A.-C. input signals $E_1(\omega_1)$, $E_2(\omega_1)$ and $E_3(\omega_1)$, of like frequency and mutually in time-phase. First signal, $E_1$, constitutes a signal to be multiplied. Second signal, $E_2$, is phase-shifted relative to the first signal by quadrature-phase shift means 26 to provide a quadrature time-phase coded reference signal, $E_c \angle 90°$, corresponding to the frequency-shifted coded reference signal $E_c(\omega_1)$ of FIG. 4. The third or multiplier signal $E_3(\omega_1)$ is also quadrature time-phase shifted relative to $E_1(\omega_1)$ by means of a capacitive input impedance 27, for reasons which will be more fully explained hereinafter.

There is also provided a voltage-sensitive, phase-inverting feedback amplifier stage responsive to the first and coded reference signals to provide phase-inverted outputs relative thereto. Such amplifier stage is comprised of a high-gain, phase-inverting amplifier 10 having a field effect transistor or like voltage-sensitive impedance 13 in cooperation with a summing network of input resistors 11 and 17, similar to like referenced elements of FIGS. 3 and 4.

There is further provided signal combining means 19' comprising a high gain amplifier 19a in feedback arrangement with feedback resistor 32 and an input summing network. The input summing network comprises a first, second and third summing resistor 28, 29 and 30, interconnecting a input of amplifier 19a with the respective outputs of first signal source $E_1$, coded reference signal source 26, and amplifier 10. Such summing network also includes reactive impedance 27 interconnecting an input of amplifier 19a with the output of third signal source, $E_3$.

A gain-control terminal 14 of voltage-sensitive feedback impedance 13 is responsively connected to the output of summing means 19b, and corresponding to the AGC loop of FIG. 4. A high-gain amplifier 16 (corresponding to the AGC circuit of FIG. 4) is interposed between the output of summing means 19' and control terminal 14 to improve the response of the AGC loop.

In order to provide a satisfactory control signal for the AGC loop, the output of summing means 19' is fed to one input of a phase-sensitive detector 31. The construction and arrangement of phase-sensitive detector 31 is known to those skilled in the art, being described for example at pages 124–133 of "Servomechanism Practice" (2nd edit.) by W. R. Ahrendt and C. J. Savant, Jr., published by McGraw-Hill (1960). Accordingly, element 31 is shown in block form only. A second or phase-reference input of detector 31 is operatively connected to the output of coded reference signal source 26. Then, the detected output is passed through a low-pass filter to improve the signal quality. In this way, the phase-sensitive detector performs the combined function of bandpass filter 18 and the associated output diode in the embodiment illustrated in FIG. 4. In other words, the quadrature-referenced detector will suppress zero-phase inputs to amplifier 16 from signal components of the output of summing means 19′, corresponding to the first input signal, $E_1$; in addition, the remaining components of the A.-C. output from signal-combining means 19′ are converted to essentially envelope, detected signals suitable for control of element 13.

The normal operation of the device of FIG. 5 is somewhat similar to that of the device of FIG. 4, it being understood that the embodiment of FIG. 5 employs time-phase coding of the reference signal (as distinguished from frequency coding). Also, although a phase-sensitive detector 31 is employed in FIG. 5 (corresponding to code means 18 of FIG. 4), no output phase-sensitive detector corresponding to the reject filter means 20 of FIG. 4 is required. The reason for this is to be seen from the effect of multiplier signal as coded and applied to an input of summing means 19′. Further, because the A.-C. signal processed employ a common carrier frequency, $\omega_1$, relatively narrow-bandwidth amplifiers may be employed for elements 10 and 19a.

In the absence of a signal to be multiplied, $E_1$, applied at input impedance 11 and a multiplier signal, $E_3$, at input impedance 27 of summing means 19′, the gain of amplifier 10 is adjusted to and maintained at unity volts/volt. This is achieved by means of the AGC action of the closed loop gain control combination (of the voltage-sensitive feedback impedance 13, amplifier 10, summing means 19′, amplifier 16 and phase-detector 31) to the reference input from source 26 applied at input impedance 17.

The summation of the coded signal from source 26 and the coded component of the phase-inverted output of amplifier 10 produces a coded difference signal component at the output of summing means 19′, which coded difference signal is detected by code means 31. The detected, coded difference signal from detector 31 is fed to AGC amplifier 16 which adjusts the impedance of feedback element 13 (and hence adjusts the closed loop gain of amplifier 10), as to cause the gain of the phase-inverted coded component of the output of amplifier 10 to vary. The sense of the AGC-produced gain variation is such as to cause the difference between the coded input signal from source 26 and the phase inverted coded output component from amplifier 10 to approach zero, corresponding to a closed loop gain of unity volts/volt for amplifier 10.

Should the impedance characteristic of feedback 13 drift so as to change the gain or output response level of amplifier 10 to the reference input from source 26, then the coded component of output $e_0$ of summing means 19′ will tend to indicate the difference between the two coded inputs thereto, caused by such drift. The response of amplifier 16 is to again provide a control signal to element 13, whereby the impedance of voltage-sensitive element 13 (and hence the closed loop gain of amplifier 10) will be adjusted in a sense or direction as to compensate for such drift, restoring the unity gain condition. By making the AGC loop gain (including the gain of amplifier 16) sufficiently high, the required difference or error signal input to amplifier 16 to maintain adjustment of element 13, is negligible. Hence, the output $e_0$ of summing means 19′ is substantially zero for the combination ($E_1=0$, $E_3=0$), corresponding to ($E_1 \times E_3 = 0 \times 0 = 0$).

With the closed loop gain of amplifier 10 maintained at unity, relative to the signal level or scaling of the inputs to summing means 19′ directly from the sources $E_1$ and 26, the phase-inverted output from amplifier 10 offsets such two inputs ($E_1 \angle 0°$ and $Ec \angle 90°$) to summing means 19′ so as to provide a substantially null output ($e_0=0$), corresponding to ($E_1 \times E_3 = E_1 \times 0 = 0$). Any variation in the analog signal $E_1$ will produce no substantial change in either the summing output $e_0$ or in the AGC loop gain. The loop gain does not change in response to an $E_1$ signal applied in time-phase quadrature relation to the output from source 26, because the phase-sensitive detector provides essentially no output response to components of the output of summing means 19′ which are in time-phase quadrature relation to the phase-reference input to detector 31 from source 26.

Therefore, any variation or change in the $E_1$ signal (applied to the inputs of amplifier 10 and summing means 19′) causes a corresponding change in the phase-inverted output of amplifier 10, whereby the sum of the change $\Delta E_1$ and the phase-inverted change, $-\Delta E_1$, effect substantially no change in the output $e_0$ of summing means 19′, in the absence of a multiplier signal, $E_3$.

The effect of an A.-C. multiplier signal $E_3$, having a like frequency and phase as $E_1$ and applied to input impedance 27 in FIG. 5, is two-fold. First, the response of summing means 19′ codes or phase-shifts $E_3$ into quadrature time-phase relation with $E_1$, whereby phase-sensitive detector 31 allows AGC loop amplifier 16 to respond thereto, so as to vary the closed loop gain of amplifier 10. In this way, multiplication of $E_1$ and $E_3$ is effected. The second effect of applying quadrature-coded multiplier signal $E_3$ at the input of summing means 19′ is to reduce the magnitude of a residual quadrature component in the output $e_0$ of summing means 19′ due to the AGC loop response to $E_c$. In this way, the scalar magnitude of $e_0$ is substantially equal to $E_1 \times E_3$, and no phase-sensitive detector or code means analogous to filter 20 of FIG. 4 is required.

The effect of the quadrature time-phase coded multiplier signal to obtain multiplication in the embodiment of FIG. 5 is to be appreciated from the response curve shown in FIG. 6.

Referring to FIG. 6, there is illustrated a curve of the impedance response of voltage-sensitive impedance 13 to an applied control voltage. The impedance $R_f$ has been normalized to the impedance $R_i$ of input resistor 11 of FIG. 5, while the applied control voltage $E_f$ (corresponding to the output from amplifier 16 in FIG. 5) is indicative of the combined inputs to amplifier 16 amplified by the gain of amplifier 16. In other words, the feedback impedance of element 13 is plotted as the ratio of $R_f$ to $R_i$, the value $\beta=1.0$ corresponding to the preselected amplitude of $E_c$ producing such gain condition.

Now, because the closed loop gain of amplifier 10 is expressed by the ratio $R_f/R_i$, it is to be appreciated that the ratio $\beta$ is indicative of such closed loop gain, and that the value $\beta=1.0$ corresponds to the condition $$(E_1 \times E_3 = E_1 \times 0 = 0)$$

Further, the operating point $\beta=1.0$ associated with the control voltage $E_f$ corresponding to the preselected value of $E_c$, is seen to lie within the middle range of the impedance performance of element 13, avoiding the non-linear response characteristics associated with the extreme (maxima and minima) performance limits of the voltage-sensitive impedance characteristic. As the control voltage, $E_f$ is perturbed from the reference value associated with $\beta=1.0$, the gain $\beta$ is seen to vary as a function of such perturbation. In other words, the perturbation $\Delta E_f$ of the control voltage produces a perturbation, $-\Delta\beta$, in the gain. Where such perturbation voltage is produced by adding a multiplier voltage $E_3$ at summing means 19′ in FIG. 5, then the gain perturbation $-\Delta\beta$, is proportional thereto:

$$-\Delta\beta = KE_3 \quad (10)$$

Therefore, the phase-inverted output of amplifier 10 in response to the several inputs thereto is:

$$-\beta(E_1 \angle 0° + E_2 \angle 90°) = -(1-\Delta\beta)[E_1 \angle 0° + E_2 \angle 90°] \quad (11)$$

Substituting Equation 10 into Equation 11:

$$-\beta(E_1 \angle 0° + E_2 \angle 90°) = (1-KE_3)[E_1 \angle 0° + E_2 \angle 90°] \quad (12)$$

Accordingly, the combined in-phase output from summing means 19' is:

$$(+1-\beta)E_1 \angle 0° = (1-1+\Delta\beta)E_1 \angle 0° \quad (13)$$
$$= \Delta\beta E_1 \angle 0° \quad (14)$$
$$= KE_3 E_1 \angle 0° \quad (15)$$

Hence, it is to be appreciated that the component of $e_0$ which is in phase with $E_1$ is indicative of the product, $E_1 \times E_3$. It is to be further appreciated that as either $E_1$ or $E_3$ changes sense, the sense of the product is correspondingly changed, whereby four-quadrant analog multiplication is achieved.

Such cursory analysis has ignored the quadrature components appearing in the output $e_0$. It is clear that if the output $e_0$ were phase-sensitive detected, relative to $E_1$, that such detected output would be free of a quadrature component. However, it is to be seen that such phase detector is not required, for the reason that in a practical design the quadrature component in the output $e_0$ of summing means 19' is a very small percentage of the full scale capability or operating range of the device of FIG. 5. In other words, the gain perturbation $\Delta\beta$ occurring due to the applied multiplier signal $E_3 \angle 90°$, provides a compensating increment ($-\Delta\beta E_c \angle 90°$) in the quadrature component of the phase-inverted output of amplifier 10 (nominally, $-E_2 \angle 90°$). This increment in the quadrature time-phase component of the phase inverted output from amplifier 10 is of opposite sense relative to the quadrature time-phase input provided by $E_2$ to summing means 19', and tends to reduce the difference therebetween toward zero, or to a negligible amount. Such AGC action is similar to the quadrature response of $e_0$ to $E_c \angle 90°$, in the absence of $E_3$, explained above. Hence, it is to be appreciated that the novel arrangement described above does not require coding means such as a phase-sensitive output detector in order to provide useful analog product signals indicative of the product, $E_1 \times E_3$.

It is to be further appreciated from FIG. 6 and from the principles of AGC operation, that the closed loop gain $\beta$ of amplifier 10 varies inversely with the applied reference signal $E_c$. Accordingly, it is to be understood that the amplitude or scalar magnitude output $E_0$ in FIG. 5 is indicative of the arithmetic operation:

$$e_0 = K' \frac{E_1 E_3}{E_c}$$

Further, because of the high-gain closed-loop action of the device of FIG. 5, any deviation of the nominal response curve (in FIG. 6) from linearity is not critical to the operation of the device.

Because the embodiment illustrated in FIG. 6 need not employ electromechanical elements, and employs circuit elements which are available in solid-state form, such analog element is capable of being manufactured in miniaturized configurations for convenient use in applications requiring low-power consumption and small-weight and-space type installations.

Accordingly, it will be seen that the device of the invention provides novel and improved analog computing means having increased drift-free accuracy and null-performance.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for multiplying a first and third signal comprising
   Gain-controlled means having a gain-control input and further having a signal input adapted to be connected to a first and second signal source;
   Signal-combining means for differentially combining at least one of the outputs of said first and second signal sources with the output from said gain-controlled means,
      said gain-control input being responsively connected to the output of said gain-controlled means for automatically adjusting the gain of said gain-controlled means; and
   Signal code means for suppressing from said gain-control input that component of the output of said gain-controlled means corresponding to said first signal, said gain-control input being adapted to be further responsively connected to a third signal source, whereby the output of said signal-combining means is indicative of the product of such first and third signals.

2. Means for multiplying a first and third signal comprising
   Gain-controlled means having a gain-control terminal and further having a signal input adapted to be connected to a first and second signal source, said second signal being coded so as to be distinguished from said first signal;
   Signal-combining means adapted to be connected to a coded third signal source for differentially combining the output from said gain-controlled means with the sum of the outputs of said first, second and third signal sources; and
   Signal code means responsively connected to said signal combining means, said gain-control terminal being responsively connected to the signal code means for automatically adjusting the gain of said gain-controlled means, whereby the output of said signal combining means is indicative of the product of said first and third signals.

3. The device of claim 2 in which said signal code means is responsive to the coded components of the output of said summing means.

4. Means for multiplying a first and third signal comprising
   Gain-controlled means having a gain-control terminal and further having a signal input adapted to be connected to a first and coded second signal source;
   Signal-combining means adapted to be connected to a coded third signal source and said first and coded second signal sources for differentially combining the sum output from said gain-controlled means with the sum of the output of said first, second and third signal sources; and
   Signal code means responsive to the coded output components of said signal combining means for providing a gain control input, said gain-control terminal being responsive to said gain-control input for automatically adjusting the gain of said gain-controlled means, whereby the output of said signal combining means is indicative of the product of said first and third signals.

5. Means for multiplying a first and third signal comprising
   Gain-controlled means having a gain-control input and further having a signal input adapted to be connected to a first and second signal source;
   signal-combining means for differentially combining the sum of the outputs of said first and second signal sources with the outputs from said gain-controlled means,
said gain-control input being responsively connected to the signal combining means for automatically adjusting the gain of said gain-controlled means to a preselected value; and
Signal code means for suppressing at said gain control input that component of the output of said signal-combining means corresponding to said first signal, said gain control input being adapted to be further connected to a third signal source, whereby the output of the said signal combining means is indicative of the product of said first and third signals.

6. The combination comprising
Phase-inverting gain-controlled amplifying means having a gain control input and adapted to be connected to sources of a first signal and a coded second signal;
Summing means responsive to said first and second signals and the phase-inverted output of said amplifying means, said gain control input being responsively connected to said summing means for automatically adjusting the gain of said amplifying means to a preselected value; and
Code means interposed between said gain control input and said summing means for suppressing gain response of said amplifying means to that component of the output of said summing means corresponding to said first signal,
Said control input being adapted to be further responsive to a source of a third signal for incrementally adjusting the gain of said amplifying means from said preselected value, whereby the output of said summing means is indicative of the product of said first and third signals.

7. The device of claim 6 including coding means interposed at the input of said amplifying means for coding said second signal relative to said first signal.

8. The device of claim 6 in which said third signal is similarly coded as said second signal, in which an input of said second summing means is adapted to be connected to said source of a third signal.

9. An electronic multiplier comprising
a phase-inverting feedback amplifier adapted to be connected to a source of a first multiplier signal and a reference signal;
A voltage-sensitive feedback impedance in the feedback circuit of said feedback amplifier; and
Summing means responsive to said first multiplier signal, said reference signal, the output of said feedback amplifier and a second multiplier signal;
Said voltage-sensitive feedback impedance being responsively connected to a control voltage source comprising the output of said summing means.

10. The device of claim 9 in which said control voltage source includes means causing said voltage-sensitive impedance to be substantially non-responsive to that component of the output of said summing means corresponding to said first multiplier signal.

11. The device of claim 9 in which said phase inverted outputs from said feedback amplifier as summed at said summing amplifier are similarly scaled as said first multiplied and reference signal inputs to said summing means, in the absence of a second multiplier signal.

12. The combinaiton comprising
A first source of an A.-C. voltage-to-be-multiplied;
A second source of a reference voltage in quadrature time-phase relation with said voltage to be multiplied;
A third source of an A.-C. multiplier voltage in quadrature time-phase relation with said voltage-to-be-multiplied;
A voltage-sensitive gain-controlled amplifier responsively connected to said first and second sources for providing phase-inverted outputs relative thereto,
A summing amplifier responsively connected to said source in said amplifier, a gain control terminal of said gain-controlled amplifier being responsively connected to the output of said summing means, and
Quadrature sensitive means interposed between said gain control terminal and said summing amplifier, whereby the output of said summing means is indicative of the product of said voltage to be multiplied and said multiplier voltage.

13. The device of claim 12 in which the gain of said amplifier is automatically adjusted substantially to unity volts per volt in the absence of a multiplier voltage.

14. The device of claim 12 in which said voltage sensitive amplifier is comprised of a feedback amplifier including a voltage-sensitive feedback impedance in the feedback path thereof.

15. A circuit arrangement for multiplying two analog signals by means of a gain-controllable phase-inverting amplifier, a first one of the analog signals and an additional reference signal being fed to an input of said amplifier, the gain of which amplifier is controlled in response to said reference signal and the other of said analog signals, said arrangement being characterized by a summing circuit responsive to said first analog signal and the output of said amplifier, whereby the output of said summing circuit is indicative of the product of said two analog signals.

16. The device of claim 15 in which a gain control input of said amplifier is responsive to the difference between the reference signal and the amplifier reference signal, for providing a reference gain of unity.

17. The device of claim 16 in which said reference signal is coded as to be distinguishable from said first analog signal, and in which the gain control input of said amplifier includes code-responsive means responsive to the output of said summing means for responding to the difference between said coded reference signal and said amplified coded reference signal to provide a reference gain control for said amplifier.

18. The device of claim 17 in which said other analog signal is coded similarly as said reference signal and applied at the input of said summing circuit, whereby said code-responsive means further responds to said coded other analog signal to vary the gain of said amplifier from said reference gain.

References Cited by the Examiner
UNITED STATES PATENTS

| | | |
|---|---|---|
| 3,082,381 | 3/1963 | Morrill et al. |
| 3,092,720 | 6/1963 | De Vrijer et al. ____ 235—194 X |
| 3,177,350 | 4/1965 | Abbott et al. _____ 235—194 X |
| 3,215,824 | 11/1965 | Alexander et al. ___ 235—194 X |

MALCOLM A. MORRISON, *Primary Examiner.*

A. J. SARLI, *Assistant Examiner.*